Patented Oct. 6, 1953

2,654,655

UNITED STATES PATENT OFFICE

2,654,655

TRISTAGE CRYSTALLIZATION AND HYDROLYSIS PROCESS FOR RECOVERING VANADIUM PHOSPHORUS AND CHROMIUM FROM FERROPHOSPHORUS AND LIKE MATERIALS

Lloyd H. Banning and Wallace E. Anable, Albany, Oreg., assignors to the United States of America as represented by the Solicitor of the Department of the Interior No Drawing. Application October 27, 1952,
Serial No. 317,165

3 Claims. (Cl. 23—107)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to the utilization of ferrophosphorus containing also chromium and vanadium, and more particularly to improvements in the separation of the valuable phosphorus, vanadium and chromium components from ferrophosphorus containing the same.

Heretofore, elemental phosphorus has been produced by the electric smelting of Western phosphate rock from the so-called "Phosphoria" formation in the States of Idaho, Montana, Wyoming and Utah in the United States of America. As a byproduct in this process, ferrophosphorus is produced, containing most of the vanadium and chromium content of the original ore. Generally, Western and similar ferrophosphorus contains by weight about 3 to 6% vanadium, about 23 to 27% phosphorus, about 3 to 6% chromium, and about 58 to 62% iron with minor amounts of other metals.

The economical separation of the foregoing valuable constituents of chrome-vanadium ferrophosphorus is an important object of this invention.

Another object is the production of trisodium phosphate, vanadium black-cake and chrome yellow in enhanced yields from ferrophosphorus containing also chromium and vanadium.

A further object is the provision of means for the recovery of phosphorus as trisodium phosphate from alkaline leach liquors containing also chromium and vanadium compounds, in high yields.

Another object is to provide a cyclic process for producing trisodium phosphate, vanadium black-cake and chrome yellow involving a trisodium phosphate crystallization for high grade and a disodium phosphate crystallization with recycling, for high recovery.

An additional object is to enhance recovery of red-cake from vanadium hydrolysates, with production of chrome yellow from the mother liquor of the vanadium hydrolysis.

Other and further objects will be apparent or will appear as the ensuing description proceeds.

The foregoing and related objects are accomplished by this invention wherein trisodium phosphate, vanadium black-cake and chrome yellow are produced from ferrophosphorus containing also chromium and vanadium, by a process involving roasting the said ferrophosphorus with salt and soda ash under oxidizing conditions, then leaching the roast product with water to dissolve compounds of phosphorus, vanadium and chromium, separating said solution and crystallizing trisodium phosphate therefrom at the temperature of maximum vanadium solubility under strongly alkaline conditions, separating said trisodium phosphate therefrom, acidifying the mother liquor to pH 8.8 by addition of phosphoric acid and crystallizing disodium hydrogen phosphate therefrom at the temperature of minimum phosphate solubility, separating and returning said disodium hydrogen phosphate crystals to the leaching solution, then adding calcium chloride to the mother liquor from the disodium hydrogen phosphate crystallization to precipitate residual phosphate as calcium phosphate, removing the precipitated calcium phosphate from the vanadium- and chromium-containing mother liquor, then acidifying the resulting solution to pH 3–pH 4 by the addition of sulfuric acid, and precipitating vanadium red-cake therefrom by heating to at least 90° C. and agitating said solution while maintaining a solution pH between pH 3.0 and pH 4.6 with portion-wise addition of sulfuric acid, removing from the solution precipitated vanadium red-cake and converting the same to black-cake, then removing residual vanadium and excess sulfate from the solution by adding lime thereto, separating the chromium-containing solution from the residue, adding lead nitrate to the solution to precipitate chrome yellow, and separating and recovering the precipitated chrome yellow.

While it is not desired to limit this invention to any particular theory of operation, its utility is in part due to the advantage taken of the anomalous concentration of phosphorus and vanadium ions in strongly alkaline solutions at specific temperatures. At temperatures between about 3° and 10° C. at a pH above about pH 10, the concentration of vanadium ions is at a maximum, while such concentration decreases at both higher and lower temperatures; at lower temperatures the concentration as well as the solubility decreases, at higher temperatures only the concentration decreases because less water of crystallization is combined in the sodium phosphate crystals. In contradistinction thereto; phosphate concentration, as well as solubility, is substantially linear under similar conditions and is directly proportional to temperature. Accordingly, trisodium phosphate can conveniently be crystallized from alkaline vanadium solutions with good separation at preferably 3° C. to 6° C.

It has further been found that the residual phosphorus content of the vanadium-containing trisodium phosphate mother liquor can be lowered to as little as 1 gram per liter or less by incorporating sufficient phosphoric acid therein to bring the pH to pH 8.8 and cooling to about minus 5° C. to plus 5° C. and separating crystalline disodium hydrogen phosphate. Thus, by adding phosphorus as phosphoric acid to the solution, it becomes possible to achieve an effective separation of phosphorus from vanadium.

Suitable ferrophosphorus for employment in accordance with this invention includes the ferrophosphorus produced as a byproduct in the electric smelting of elemental phosphorus from Western phosphate rock, and similar ferrophosphorus containing appreciable quantities of chromium and vanadium. For example, the ferrophosphorus produced at Pocatello, Idaho, and that produced by the Tennessee Valley Authority from phosphatic shale from the Fort Hall Indian Reservation in Idaho, have been found entirely suitable. In general, suitable ferrophosphorus contains from about 3 to 6% by weight of vanadium, from 24 to 27% by weight of phosphorus, from 58 to 61% by weight of iron, from 3 to 6% by weight of chromium and may contain minor amounts of other metals.

In order to solubilize the phosphorus, chromium, and vanadium content of the ferrophosphorus while at the same time avoiding the formation of soluble iron compounds, the ferrophosphorus is first ground to about minus 35-mesh and roasted with salt and soda ash. Preferably, about 1.45 parts by weight of soda ash are incorporated with the ferrophosphorus and about 1 part of salt (ordinary sodium chloride) for 10 parts of ferrophosphorus. An excess of salt causes the roast charge to become plastic below the optimum roasting temperature and causes clogging of the usual rotary kiln.

A suitable temperature for carrying out the roasting operation is between 780° and 800° C. in oxidizing conditions. Increasing the temperature results in a plastic charge which is insufficiently calcined. At substantially lower roasting temperatures the extraction of available elements is insufficient in later leaching operations. Under preferred conditions, sufficient oxidation is obtained to produce pentavalent vanadium and phosphorus, and hexavalent chromium. Excessive oxidation tends to solubilize the iron content as water-soluble sodium ferrate, an undesired reaction. It has been found that employing the above preferred roasting conditions, at least 95% each of the vanadium and phosphorus content, and at least 70% of the chromium became water-soluble while virtually none of the iron in the ferrophosphorus was rendered water-soluble. Following calcination, the roasted product was discharged into a boiling aqueous leach solution wherein its water-soluble content was dissolved. Preferably, the leach solution was maintained at a temperature between 60° C. and the boiling point of the solution while being mechanically agitated. There results a strongly alkaline solution which is maintained at a specific gravity of 1.27 or less by the continuous or portion-wise addition of hot water. After completing the leaching operation, the clear solution is separated from the solid residue by filtration, decantation or the like, while still hot. A typical leach solution contains between 8 and 18 grams per liter of vanadium as sodium vanadate, and about 50 to 55 grams per liter of phosphorus as trisodium phosphate, as well as moderate amounts of chromium. The solution is strongly alkaline and, in general, has a pH above 10.

The strongly alkaline leach solution is then cooled to the temperature at which vanadium displays its maximum concentration under strongly alkaline conditions. In general, the temperature of maximum vanadium concentration lies between 3° and 10° C. and is usually within the more restrictive range of 3° to 6° C. It has been found that the trisodium phosphate concentration, as well as solubility, is a substantially linear function of temperature and is directly proportional thereto, while the concentration of vanadium is anomalous. At temperatures above 10° C. the vanadium concentration becomes less due to release of water of crystallization from the trisodium phosphate and at temperatures below about 3° C. the vanadium rapidly crystallizes out of solution with the trisodium phosphate. Accordingly, the leach solution is cooled to a temperature between about 3° to 10° C. whereby a good separation of phosphorus as trisodium phosphate with minimum vanadium contamination is achieved. Subsequently, after centrifuging, the crude trisodium phosphate is recrystallized from water and the mother liquor from the recrystallization is desirably returned to the original leach solution.

Following the separation of trisodium phosphate in the primary crystallization stage, the hydrogen ion concentration of the mother liquor remaining from the primary phosphate crystallization is adjusted by the addition of phosphoric acid to about pH 8.8. At this pH, it becomes possible to separate a substantial quantity of phosphorus still remaining in solution in the form of disodium hydrogen phosphate while maintaining the chromium and vanadium contents of the leach still in solution. Accordingly, after adjusting the solution to pH 8.8, it is then cooled to a temperature between about minus 5° C. and plus 5° C. whereupon the phosphorus content of the pregnant solution is brought to less than 1 gram per liter. The crystals of disodium phosphate are separated from the pregnant solution preferably by centrifuging and are returned to the original leach solution for ultimate recovery as trisodium phosphate.

The pregnant solution now contains substantially all of the vanadium and chromium content of the original leach solution and has only traces of phosphate remaining therein. To remove the traces of residual phosphate, sufficient calcium chloride is added thereto to precipitate the phosphate as tricalcium phosphate. This precipitation can be carried out at room temperature and preferably the precipitate is separated from the pregnant solution by decantation, filtration, or the like.

The next step in the process is the recovery of the vanadium content as red-cake. This is accomplished by the incorporation of sulfuric acid with the solution to yield a hydrogen ion concentration of about pH 3.0 and heating the solution to the boiling point with vigorous agitation. The red-cake begins to precipitate and portion-wise additions of sulfuric acid are made to maintain the solution pH between 3.0 and 4.5. It has been found that between 90 and 98% of the vanadium content of the solution is recovered in the form of vanadium red-cake. The red-cake produced is separated from this solution by filtration or the like and fused at a temperature of 800° C. to convert it into black-cake. It has been found that the produced black-cake meets commercial specifications.

The filtrate from the red-cake precipitation contains substantially all of the chromium leach from the original ferrophosphorus and is in concentration of about 10 to 14 grams per liter. Traces of vanadium and excess sulfate remaining in solution are removed by incorporating lime in an amount sufficient to raise the solution pH to about 10.9. Following the lime precipitation step, the solution is filtered and sufficient lead nitrate incorporated therewith to precipitate the chromium content as lead chromate. The lead chromate produced is recovered, after filtration, in the form of pigment quality chrome yellow. In place of lead nitrate, lead acetate may be employed to precipitate the chrome yellow. In general, from 3 to 9 parts by weight of lead acetate or lead nitrate is employed per part by weight of chromium in solution in order to yield a high grade of chrome yellow. Substantial quantitative recovery of chromium from the solution results.

It will be apparent from the foregoing description that this invention provides a simple and economical method for the recovery of the chromium, vanadium, and phosphorus contents of Western ferrophosphorus in high yield. In actual operation, it has been found that about 80% of the vanadium, 65% of the chromium, and 91% of the phosphorus contained in Western ferrophosphorus can be recovered in the form of commercially acceptable vanadium black-cake, pigment quality chrome yellow, and trisodium phosphate.

Since many apparently differing embodiments of this invention will occur to one skilled in the art, obviously various changes may be made in the invention as hereinbefore disclosed, without departing from its spirit and scope.

What is claimed is:

1. In a process for the production of vanadium red-cake, chrome yellow, and trisodium phosphate from ferrophosphorus containing also vanadium and chromium, involving roasting such ferrophosphorus with salt and soda ash, the improvement which comprises leaching the roasted product with water, separating a leach solution containing trisodium-phosphate, -vanadate and -chromate, then cooling said solution and separating in a primary crystallization step, a crop of trisodium phosphate crystals containing also vandiun and chromium, redissolving said primary crystal crop in water and recovering by recrystallization a secondary crop of trisodium phosphate crystals as a product, returning the mother liquor from recrystallization to the leach solution, then adding phosphoric acid to the mother liquor from said primary crystallization to convert residual dissolved phosphate values into disodium hydrogen phosphate, subjecting the thus treated solution to a tertiary crystallization step to recover a crop of disodium hydrogen phosphate crystals and a pregnant solution low in phosphorus but containing chromium and vanadium, returning said disodium hydrogen phosphate crystals to the said leach solution, then adding calcium chloride to the pregnant solution to precipitate residual phosphate as tricalcium phosphate, separating said precipitated tricalcium phosphate, acidifying the solution with sulphuric acid and heating and agitating the remaining solution containing chromium and vanadium, at an acidic pH, to precipitate vanadium red-cake, separating the red-cake and treating the mother liquor with enough lime to precipitate residual vanadium and part of the calcium sulfate, removing the precipitate, precipitating chrome yellow from the remaining solution by addition of lead nitrate, and then separating and recovering the chrome yellow.

2. In a process for separating compounds of phosphorus, vanadium and chromium from a strongly alkaline sodium solution containing the same, the improvement which comprises cooling said solution to a temperature between 3° and 10° C. to precipitate trisodium phosphate crystals, removing the same, then adjusting the pH of the mother liquor to pH 8.8 by the addition of phosphoric acid, cooling the solution to a temperature between minus 5° C. and plus 5° C. to precipitate disodium hydrogen phosphate crystals, and then separating and recovering a solution containing chromium, vanadium, and less than 1 gram per liter of phosphorus.

3. In a process for removing phosphorus from an alkaline sodium, phosphorus and vanadium-bearing solution, the improvement which comprises cooling said solution to the temperature of maximum vanadium concentration whereby trisodium phosphate crystals are precipitated, removing said crystals, then adding phosphoric acid to said solution and separating the remaining crystallizable phosphorus content as disodium hydrogen phosphate.

LLOYD H. BANNING.
WALLACE E. ANABLE.

No references cited.